United States Patent [19]

Squire

[11] 4,195,888
[45] Apr. 1, 1980

[54] MOUNTING SOCKET

[75] Inventor: Herbert D. Squire, Galesburg, Ill.

[73] Assignee: Magic Chef, Inc., Cleveland, Tenn.

[21] Appl. No.: 924,150

[22] Filed: Jul. 13, 1978

[51] Int. Cl.² .................... F25D 11/00; A47G 29/00
[52] U.S. Cl. .................................. 312/214; 312/140; 403/263; 248/235
[58] Field of Search ............... 312/214, 140; 403/263, 403/372, 365; 248/235, 239; 85/80

[56] References Cited

U.S. PATENT DOCUMENTS

| 1,291,321 | 1/1919 | Whittier et al. | 248/239 |
| 2,118,659 | 5/1938 | Sywert | 312/214 |
| 2,146,950 | 2/1939 | Foster | 312/214 |
| 2,244,978 | 6/1941 | Tinnerman | 248/239 |
| 2,620,254 | 12/1952 | Beckett | 312/214 |
| 2,620,255 | 12/1952 | Beckett | 312/214 |
| 3,652,032 | 3/1972 | Eros et al. | 248/235 |
| 3,701,373 | 10/1972 | Wronke et al. | 85/80 |

FOREIGN PATENT DOCUMENTS 957253 11/1974 Canada ........................................ 85/80
2537368 8/1975 Fed. Rep. of Germany ............. 85/80
297533 3/1954 Switzerland ............................... 403/263

Primary Examiner—Victor N. Sakran
Attorney, Agent, or Firm—Bacon & Thomas

[57] ABSTRACT

A mounting socket is installed within a refrigerator which has a thin inner liner wall and an outer cabinet with an insulation space therebetween. The socket is capable of receiving a horizontally extending mounting bracket associated with an internal shelf. The socket has a body with an opened first end, a closed second end and an intermediate section. The intermediate section of the body is positioned within a hole in the inner liner with its second end located within the insulation space. The body has a cavity which is capable of receiving the horizontally extending mounting bracket. The socket has a lip which radially extends from the first end for sealed engagement with a first side of the wall. The socket also includes a plurality of locating dimples which extend radially from the intermediate portion of the body to overlie the other side of the wall to prevent the socket from being withdrawn from the hole.

8 Claims, 4 Drawing Figures

MOUNTING SOCKET

BACKGROUND OF THE INVENTION

1. Field of the Invention

This invention relates to a mounting device which is adapted to permit simple installation and support of an inner component or shelf horizontal support member within a refrigerator or freezer of the type having a thin wall inner liner and an outer cabinet with insulation therebetween.

2. Description of the Prior Art

It is customary practice to provide suitable mounting means for these support members which are anchored to the interior side walls of the refrigerator. Often these mounting devices are adapted to be received within holes in the side walls without providing for positive sealing of the holes which could reduce the cooling efficiency of the refrigerator of the type having no foamed insulation. In a refrigerator of the type where foamed insulation is used, the socket is expected to provide sealing of the inner wall to prevent leakage of the foaming material from the insulation space into the refrigerator compartment. Furthermore, these mounting devices, while being designed to insure positive retention of the support members, often do not facilitate installation and removal of the shelves or inner components either during initial installation or for subsequent cleaning.

SUMMARY OF THE INVENTION

It is, therefore, an object of this invention to provide a simple and economical mounting socket for securing refrigerator inner components to a refrigerator inner liner.

In is an additional object of this invention to provide such a mounting socket which includes means for positive sealing of the mounting hole in the refrigerator inner liner.

It is yet another object of this invention to provide such a mounting socket which permits ease of removal and withdrawal of the refrigerator inner components during initial installation or during removal for cleaning without allowing their accidental removal during normal use.

These and other objects of the invention are provided in a preferred embodiment thereof which includes a mounting socket installed within a refrigerator or the like which has an insulation space therebetween. The socket is capable of receiving a horizontally extending support member associated with an internal shelf or the like. The socket comprises a body having an open first end, a closed second end and an intermediate section therebetween. The body internal cavity extends along its axis from the first end to the second end. This cavity has an upper portion and a lower portion. The intermediate section of the body is positioned within a hole within a vertical region of the inner liner with the second end located within the insulation space. The upper portion of the cavity is capable of receiving the horizontally extending support member. The lower portion of the cavity is also capable of receiving the horizontally extending support member therein. The upper portion of the cavity has a first depth from the first end which is greater than a second depth in the lower portion as measured from the first end to allow greater insertion of the horizontally extending support member in the upper portion than in the lower portion than in the lower portion of the cavity.

These and other objects and advantages of the present invention will become apparent from reading the following specification, reference being made to the accompanying drawings, and the appended claims.

DESCRIPTION OF THE PREFERRED EMBODIMENT

The preferred mounting socket is of a type which is designed to be inserted in a hole in a refrigerator or freezer inner liner and to entend into an insulation space between the side liner and the outer cabinet. Normally, pairs of sockets mounted on opposite side inner liners of the refrigerator are utilized. A shelf or refrigerator inner component of the type having a straight horizontally extending support member for insertion into the mounting socket is to be supported by the mounting sockets. The support members are spaced on the shelf to have an overall length greater than the distance between the inside walls of the inner liner to allow each member to be retained within an interior cavity of the sockets during normal use of the shelf. In some installations, some type of mounting socket can be used alone if the side of the shelf opposite the inner liner is mounted in some other fashion either at the opposite inner liner or at an intermediate support member.

Figure 1:
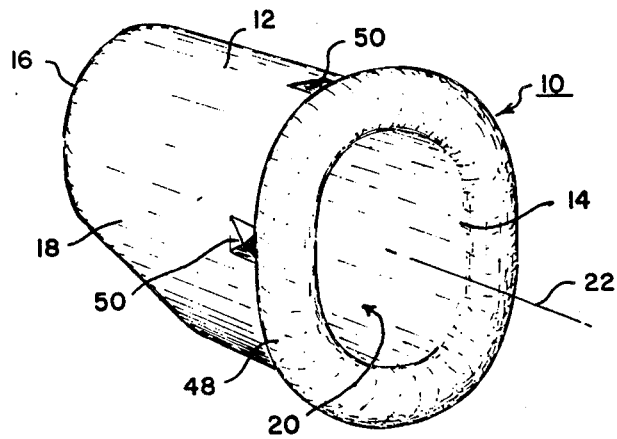
FIG. 1 is a perspective view of the preferred mounting socket of the present invention.
Figure 2:
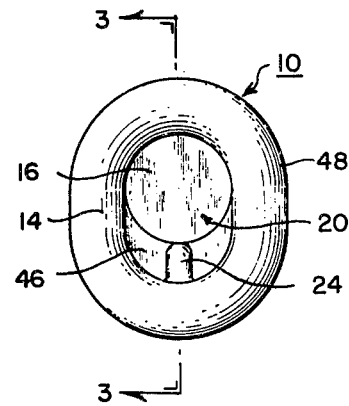
FIG. 2 is an end view of the mounting socket of FIG. 1.

The preferred embodiment of the invention is shown in FIG. 1 to include a mounting socket 10 which has a body 12 having an open first end 14, a closed second end 16 and an intermediate section 18 therebetween. The body 12 has an internal cavity 20 extending along an axis 22 from its first end 14 to its second end 16. The preferred socket 10 is made of a resilient material such as rubber, plastic or vinyl. As can be best seen in FIG. 2, the body 12 also includes a rib 24 extending from a bottom portion thereof towards the center of the cavity 20. The purpose of the rib 24 will be discussed hereinbelow.

Figure 3:
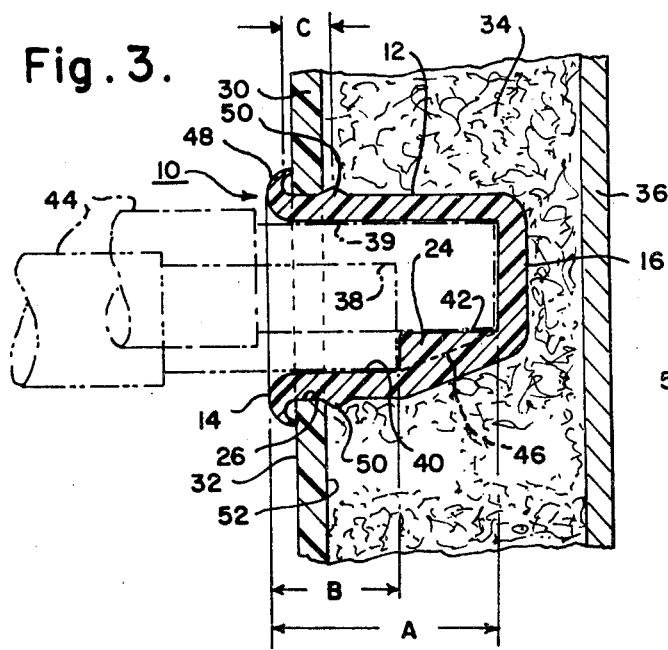
FIG. 3 is a view of the mounting socket as seen along line 3—3 of FIG. 2 as mounted in a refrigerator with a support member shown in phantom at two locations therein.

With the mounting socket 10 shown in an installed position in FIG. 3, it can be seen that the intermediate section 18 of the body 12 is positioned within a hole 26 in a vertical region of the inner liner 30. The first end 14 is located adjacent the first surface 32 of the inner liner 30 and the second end 16 of the body 12 is located within an insulation space 34 formed between the inner liner 30 and the outer cabinet 36.

A horizontally extending support member of a refrigerator shelf or the like is shown at 38 in phantom to be installed in a position where it rests in a lower portion 40 of the cavity 20. The rib 24 prevents undesired horizontal movement of the support member 38 to prevent disengagement of the member from a socket at the other end of the shelf which is needed for its support. It should be noted that a step extending all the way across the cavity would function the same as the rib 24 to prevent this undesired horizontal movement of support member 39 but the rib 24 is preferred for other reasons which will be made apparent hereinbelow.

The support member is also shown in phantom at 39 in another position where it rests in an upper portion 42 of the cavity 20. Installation of the support member in the position at 39 allows greater insertion of the support member into the body 12. Accordingly, the upper portion 42 of the cavity 20 has a first depth A from the first end 14 which is greater than a second depth B in the lower portion 40 as measured from the first end 14.

To install the refrigerator shelf 44, the support member 38 is vertically positioned at 39 to a depth A within the cavity 20. This allows the support member on the other side of the shelf 44 to be easily inserted in the opposite mounting socket.

After the other support member is so aligned, the support member is then moved from the upper portion 42 of the lower portion 40 to cause it to extend into the body to the depth B thereby insuring the support member at the other side of the shelf 44 is fully received with the cavity of its mounting socket. This movement centers the shelf 44 within the refrigerator and insures its support during normal use. If a pair of identical mounting sockets 10 are used at both ends of the shelf, either end of the shelf 44 may be inserted into its mounting socket first.

To remove the shelf 44, the support member at one side thereof is vertically raised to the level of the upper portion 42 of the cavity 20 and moved horizontally to the depth A. At this depth the support member on the other end of the shelf 44 is removed from its socket to release the shelf.

In the preferred embodiment the transition from depth A to depth B is provided by a sloped surface 46 at a side of the rib 24. Although the support member as described above is intended to be a rod like member having a uniform circular cross section, some support members may be utilized which have a longitudinal slot or notch at the lower surface thereof. Such a support member would have an inverted U-shaped cross section capable of receiving the rib 24 within the notch preventing it from effectively restricting the horizontal movement of the support member when it is in the lower portion 40 of the cavity 20. When such a support member is initially positioned at depth A and then released, it will slide down the sloped surface 46. This sliding action tends to center the shelf 44 to accommodate the rib 24 between the side liners 30. When the shelf 44 is level the support members will be positioned at 38 as before and undesired horizontal movement of the shelf will be resisted by the sloped surface 46.

As explained thus far, the preferred support member 10 is capable of properly supporting a shelf or the like. However, there are included in the invention other features which make it particularly suited for use in refrigerators or freezers.

As seen in FIG. 3, the preferred mounting socket 10 further includes a radially extending lip means 48. The lip means 48 extends from the first end 14 of the body 12 and is curled away from the first end and toward the intermediate portion 18 to overlie the first side 32 of the inner line 30 around the hole 26. The action of the curled lip means 48 prevents full insertion of the body 12 into the hole 26 and maintains the first end 14 adjacent the first side of the inner liner 30. As can be seen, the lip means 48 is deflected when the body is properly installed to cause its outer periphery to maintain sealing contact with the side 32 of the liner 30.

Figure 4:
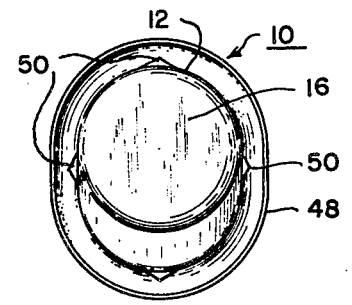
FIG. 4 is a view of the opposite end of the mounting socket from that shown in FIG. 2.

As seen in FIG. 4, the socket 10 also includes locating means 50 which radially extend from the intermediate portion 18 of the body 12 to overlie a second side 52 of the inner liner 30 adjacent the hole 26. The locating means 50 make contact with the second side 52 of the inner liner 30 to resist withdrawal of the body 12 from the hole 26. Since the body 12 and the locating means 50 are formed of resiliently deformable material, they can be sufficiently compressed during initial installation of the socket 10 within the hole 26 and will return to the configuration shown once installed. This installation method requires a significant amount of force to be applied to the socket in the axial direction which force is greater than that which might inadvertently be applied to the socket in a direction tending to withdraw it from the hole 26 during normal use.

The inner liner 30 can be expected to have a thickness within predetermined limits according to the manufacturing tolerances of the particular refrigerator being used. The locating means 50 is provided at a predetermined distance C from the first end 14 so that the lip means 48 and the locating means 50 will respectively engage the first side 32 and the second side 52 of the inner liner 30 independent of the actual thickness of the inner liner as long as that thickness is within the predetermined limit. When the inner liner 30 has a thickness within these predetermined limits the lip 48 and the locating means will resiliently deform by the liner to lock the sock 10 within the hole 26.

This locking feature also has the advantage of sealing the hole 26 thereby preventing ingress of foam insulation material during the foaming process.

It should be noted that at least a portion of the body 12 of the socket 10 could be made of a non resilient material with the lip means and the locating means being made of resilient material. Further, the rib 24 may be removed if a positive stop of the mounting bracket is not required in the horizontal direction and the centering feature discussed above is preferred for use with a solid bracket without a slot therein.

Additionally, if the entire socket 10 is made out of non resilient material, the lip 48 will not be deflected but will be held tight against the first side 32 of the inner liner 30 by the angle on the locating means 50.

While this invention has been shown and described with reference to the above embodiment, other forms will be readily apparent to those skilled in the art and, therefore, the description is not intented to limit the scope of the invention by the embodiment selected, but only by the claims which follow.

I claim:

1. A mounting socket installed within a refrigerator or the like which has an inner liner including a thin wall, an outer cabinet with an insulation space therebetween, said socket being capable of receiving a horizontally extending mounting device associated with an internal shelf or the like, said socket comprising:

a body having an opened first end, a closed second end and an intermediate section therebetween, said body having an internal cavity extending along its axis from said first end to said second end;

said cavity having a horizontally oriented upper portion and a horizontally oriented lower portion thereof when said intermediate section of said body is positioned within a hole in a vertical region of said inner liner with said second end located within said insulation space;

said upper portion of said cavity being capable of receiving said horizontally extending mounting bracket therein;

said lower portion of said cavity being capable of receiving said horizontally extending mounting bracket therein;

said upper portion of said cavity having a first depth from said first end which is greater than a second depth in said lower portion as measured from said first end to allow greater insertion of said horizontally extending mounting bracket in said upper portion than in said lower portion of said cavity; and said lower portion of said cavity providing a final resting position for said mounting device allowing normal positioning of said shelf in said refrigerator.

2. A mounting socket as set forth in claim 1, further including radially extending lip means from said first end of said body and overlying a first side of said wall around said hole to maintain said first end adjacent said first side to said wall.

3. A mounting socket as set forth in claim 2, wherein said lip means extends about the entire circumference to said first end for sealing engagement with said first side of said wall.

4. A mounting socket as set forth in claim 2, further including locating means radially extending from said intermediate portion of said body to overlie a second side of said wall adjacent said hole to make contact therewith to resist withdrawal of said body from said hole.

5. A mounting socket as set forth in claim 4, wherein said lip means and said locating means are made of resiliently deformable material.

6. A mounting socket as set forth in claim 5, wherein said wall has a thickness within predetermined limits; said lip is curled away from said first end toward said intermediate portion; said locating means is a predetermined distance from said first end; and said predetermined distance is such that said lip means and said locating means will respectively engage said first and said second sides of said wall independently of said thickness within said predetermined limits.

7. A mounting socket as set forth in claim 1, further including a sloped surface extending from said upper portion of said cavity to said lower portion of said cavity to define said first and said second depths, said sloped surface providing guiding means for movement of said horizontally extending mounting bracket from said upper portion at said first depth to said lower portion at said second depth.

8. A mounting socket as set forth in claim 1, wherein the body is made of a resiliently deformable plastic material.

* * * * *